United States Patent
Murakami et al.

(10) Patent No.: US 10,412,323 B2
(45) Date of Patent: Sep. 10, 2019

(54) HIGH-TEMPERATURE OBJECT OBSERVATION DEVICE

(71) Applicant: IHI CORPORATION, Tokyo (JP)

(72) Inventors: Yu Murakami, Tokyo (JP); Takaaki Matsuoka, Tokyo (JP); Fumio Matsuzaka, Tokyo (JP); Daisuke Abe, Tokyo (JP)

(73) Assignee: IHI Corporation, Tokyo (JP)

(*) Notice: Subject to any disclaimer, the term of this patent is extended or adjusted under 35 U.S.C. 154(b) by 0 days.

(21) Appl. No.: 15/896,885

(22) Filed: Feb. 14, 2018

(65) Prior Publication Data

US 2018/0176485 A1 Jun. 21, 2018

Related U.S. Application Data

(63) Continuation of application No. PCT/JP2016/073983, filed on Aug. 17, 2016.

(30) Foreign Application Priority Data

Aug. 18, 2015 (JP) ................................ 2015-160946

(51) Int. Cl.
| | |
|---|---|
| *H04N 5/225* | (2006.01) |
| *B23K 9/095* | (2006.01) |
| *B23K 9/24* | (2006.01) |
| *H04N 5/33* | (2006.01) |
| *B23K 9/167* | (2006.01) |
| *G02B 7/00* | (2006.01) |

(Continued)

(52) U.S. Cl.
CPC ............... *H04N 5/33* (2013.01); *B23K 9/095* (2013.01); *B23K 9/167* (2013.01); *B23K 9/24* (2013.01); *G01J 5/06* (2013.01); *G01J 5/48* (2013.01); *G01J 5/60* (2013.01); *G02B 5/003* (2013.01); *G02B 7/003* (2013.01); *H04N 5/2254* (2013.01)

(58) Field of Classification Search
None
See application file for complete search history.

(56) References Cited

U.S. PATENT DOCUMENTS 4,365,307 A * 12/1982 Tatsuwaki ................. G01J 5/60
348/162
4,644,131 A 2/1987 Richardson
(Continued)

FOREIGN PATENT DOCUMENTS

CN 201378240 Y 1/2010
CN 101710226 A 5/2010
(Continued)

*Primary Examiner* — Fernando Alcon
(74) *Attorney, Agent, or Firm* — Volpe and Koenig, P.C.

(57) ABSTRACT

Provided is a high-temperature object observation device including a camera capable of acquiring an image of an observation region adjacent to a heat source and a light shielding device. In the high-temperature object observation device, a light shielding device includes a light shielding part that covers the vicinity of the heat source, a holding object that holds the heat source at a position exposed from the light shielding part, and an actuator that releases engagement of the holding object, and immediately after the light shielding device is brought into operation and the heat source is covered with the light shielding part, the camera acquires an image of the observation region.

20 Claims, 6 Drawing Sheets

(51) Int. Cl.
*G02B 5/00* (2006.01)
*G01J 5/60* (2006.01)
*G01J 5/48* (2006.01)
*G01J 5/06* (2006.01)

(56) References Cited

U.S. PATENT DOCUMENTS

| | | | |
|---|---|---|---|
| 5,275,327 A * | 1/1994 | Watkins | B23K 9/1274 |
| | | | 219/124.34 |
| 2009/0161212 A1 | 6/2009 | Gough | |
| 2010/0206851 A1 * | 8/2010 | Nakatate | B23K 9/0956 |
| | | | 219/75 |
| 2012/0145689 A1 | 6/2012 | Hillen et al. | |
| 2018/0176485 A1 | 6/2018 | Murakami et al. | |

FOREIGN PATENT DOCUMENTS

| | | | | |
|---|---|---|---|---|
| CN | 101870030 A | | 10/2010 | |
| CN | 102353620 A | | 2/2012 | |
| CN | 103773920 A | | 5/2014 | |
| CN | 203807498 U | | 9/2014 | |
| CN | 104227185 A | | 12/2014 | |
| CN | 204177231 U | | 2/2015 | |
| EP | 0219691 A1 | | 4/1987 | |
| EP | 3339824 A1 | | 6/2018 | |
| GB | 2419312 A | * | 4/2006 | ............... B23K 9/16 |
| JP | 60-033874 A | | 2/1985 | |
| JP | 61286064 A | * | 12/1986 | |
| JP | 04-064464 U | | 6/1992 | |
| JP | 07-016744 A | | 1/1995 | |
| JP | 08-240833 A | | 9/1996 | |
| JP | 09141432 A | * | 6/1997 | |
| JP | 2000-131149 A | | 5/2000 | |
| JP | 2004-061481 A | | 2/2004 | |
| JP | 2007-192579 A | | 8/2007 | |
| JP | 2008-268106 A | | 11/2008 | |
| JP | 2008-275482 A | | 11/2008 | |
| JP | 2009-050872 A | | 3/2009 | |
| JP | 2013-545620 A | | 12/2013 | |
| JP | 2014-124671 A | | 7/2014 | |
| JP | 2015-179010 A | | 10/2015 | |
| WO | 2015/038711 A1 | | 3/2015 | |
| WO | 2017/030142 A1 | | 2/2017 | |

\* cited by examiner

HIGH-TEMPERATURE OBJECT OBSERVATION DEVICE

This application is a Continuation Application based on International Application No. PCT/JP2016/073983, filed on Aug. 17, 2016, which claims priority on Japanese Patent Application No. 2015-160946, filed on Aug. 18, 2015, the contents of which are incorporated herein by reference.

TECHNICAL FIELD

The present disclosure relates to a high-temperature object observation device which is used for non-contact temperature measurement.

BACKGROUND ART

In a case where temperatures of high-temperature objects such as a metal molten pool which is formed during welding and its peripheral area, or metals during heat treatment, a boiler, and the inside of a blast furnace are measured, a contact-type temperature probe which is a general temperature detector may not be able to be installed. Alternatively, even in a case where a temperature probe can be installed, the temperature probe detects the temperature at its installation point. For this reason, there is a possibility that a temperature distribution on a wide range of surfaces cannot be ascertained.

A noncontact-type optical temperature measurement method is known as means for solving such circumstances. In the optical temperature measurement method, an image is acquired using thermography, a near-infrared camera, a visible light camera or the like, and the temperature distribution of an object to be measured is obtained by the acquired image. In this case, the temperature of the object to be measured is detected using thermal radiation (radiated light) from the object to be measured. A relationship between radiated light and temperature is subject to a relational expression known as the Planck's equation, and thus in further consideration of emissivity specific to substance, it is possible to determine a temperature from the intensity of radiated light (luminance of radiated light).

Since the intensity of radiated light changes drastically due to even a slight difference in temperature, high-accuracy measurement can be made. However, there is a possibility that the temperature of the object to be measured is not able to be accurately measured in a situation in which a heat source is close to an object to be measured due to intensive radiated light from the heat source serving as noise.

For example, in a case where the heat source is a TIG torch, and the object to be measured is a melting portion of a weld object, a TIG electrode is located at a position close to the melting portion (molten pool and the periphery of the molten pool), and furthermore emits intensive radiated light at high temperature. For this reason, radiated light from the TIG electrode is reflected from the melting portion, and the reflected radiated light serves as noise, which leads to the possibility of an accurate temperature not being able to be measured.

As a method for solving such circumstances, it is considered to make observation from a direction in which radiated light from the heat source is not reflected. However, since a camera to be used is large in size and has a restriction on its installation position, the camera is likely not to be installed at an appropriate position. In addition, when an image is captured by the camera, it is also considered to shield the radiated light from the heat source. However, temperature measurement is disturbed even in a case where the amount of leakage of the radiated light is slight, and thus a high degree of accuracy is required for the installation of a light shielding member.

Patent Document 1 discloses a temperature information measurement method for excluding the influence of disturbance light by selecting three or more sets of wavelengths, each set including two wavelengths, of the amount of radiation radiated from a test object, detecting the intensity of the amount of radiation at two wavelengths for each set, executing relative temperature calculation while sequentially adding or subtracting the numerical value of the amount of radiation equivalent to each wavelength to or from each measured radiation value, and setting a temperature when a temperature value obtained from two or more expressions reaches an allowable range to the temperature of the test object.

PTLs 2 to 4 also disclose a device that measures a temperature.

CITATION LIST

Patent Documents

[Patent Document 1] Japanese Unexamined Patent Application, First Publication No. 2008-268106
[Patent Document 2] Japanese Unexamined Patent Application, First Publication No. 2008-275482
[Patent Document 3] Japanese Unexamined Patent Application, First Publication No. 2004-61481
[Patent Document 4] Japanese Unexamined Patent Application, First Publication No. 2000-131149

SUMMARY

Technical Problem

An object of the present disclosure is to provide a high-temperature object observation device that suppresses the influence of radiated light emitted from a heat source during temperature measurement.

Solution to Problem

According to a first aspect of the present disclosure, there is provided a high-temperature object observation device including: a camera capable of acquiring an image of an observation region adjacent to a heat source; and a light shielding device, wherein the light shielding device includes a light shielding part that covers a vicinity of the heat source, a holding part that holds the heat source at a position exposed from the light shielding part, and an actuator that releases the holding of the holding part, and immediately after the light shielding device is brought into operation and the heat source is covered with the light shielding part, the camera acquires an image of the observation region.

According to the present disclosure, an excellent effect is exhibited in which it is possible to accurately measure a distribution of temperature of an observation region with radiated light from a heat source removed with a high degree of accuracy, and to easily install a light shielding device without requiring excessive accuracy in the installation of the light shielding device.

DESCRIPTION OF EMBODIMENTS

Hereinafter, an example of the present disclosure will be described with reference to the accompanying drawings.

First, in FIGS. 1, 2A, and 2B, a high-temperature object observation device 1 according to a first embodiment of the present disclosure will be described.

The present embodiment corresponds to a case of being applied to the observation of a high-temperature object in downward TIG welding, and an object to be measured is a melting portion. In FIG. 1, sign 2 indicates a TIG torch, sign 3 indicates a weld object which is welded to the TIG torch 2, sign 4 indicates a pedestal on which the weld object 3 is placed, sign 5 indicates a control unit of welding, sign 6 indicates a display part, and the control unit 5 measures a temperature on the basis of an image signal from a camera 7 described later.

The pedestal 4 is provided with a strut 8, a guide rail 9 (extending perpendicularly to the plane of paper) extending in a horizontal direction is supported on the strut 8, and the guide rail 9 can move vertically. The guide rail 9 is provided with a traveling device 11. The TIG torch 2 is provided on the traveling device 11 and can move in a direction perpendicular to the plane of paper.

The TIG torch 2 includes a cylindrical shielding gas nozzle 12 that ejects a shielding gas, and a TIG electrode 13 made of tungsten, provided concentrically with the shielding gas nozzle 12, which protrudes from the tip of the shielding gas nozzle 12. The TIG electrode 13 is a heat source that performs self-light emission, and the length of the TIG electrode 13 is, for example, equal to or less than 20 mm. The weld object 3 melts by generating an arc 14 from the TIG electrode 13, and a molten pool 15 is formed.

The camera 7 is located on the lateral side of the TIG torch 2, and the camera 7 is provided on the strut 8 with a camera guide 16 interposed therebetween. The camera 7 is, for example, a digital camera capable of high-speed photography, and the camera 7 can continuously capture an image of an observation region 20 which is the molten pool 15 and its peripheral part. In addition, the camera 7 has a CCD or a CMOS sensor as an imaging element, and has signals emitted individually from respective pixels constituting the imaging element. Further, the positions of pixels within the imaging element can be specified on the basis of the signals from the respective pixels.

Figure 1:
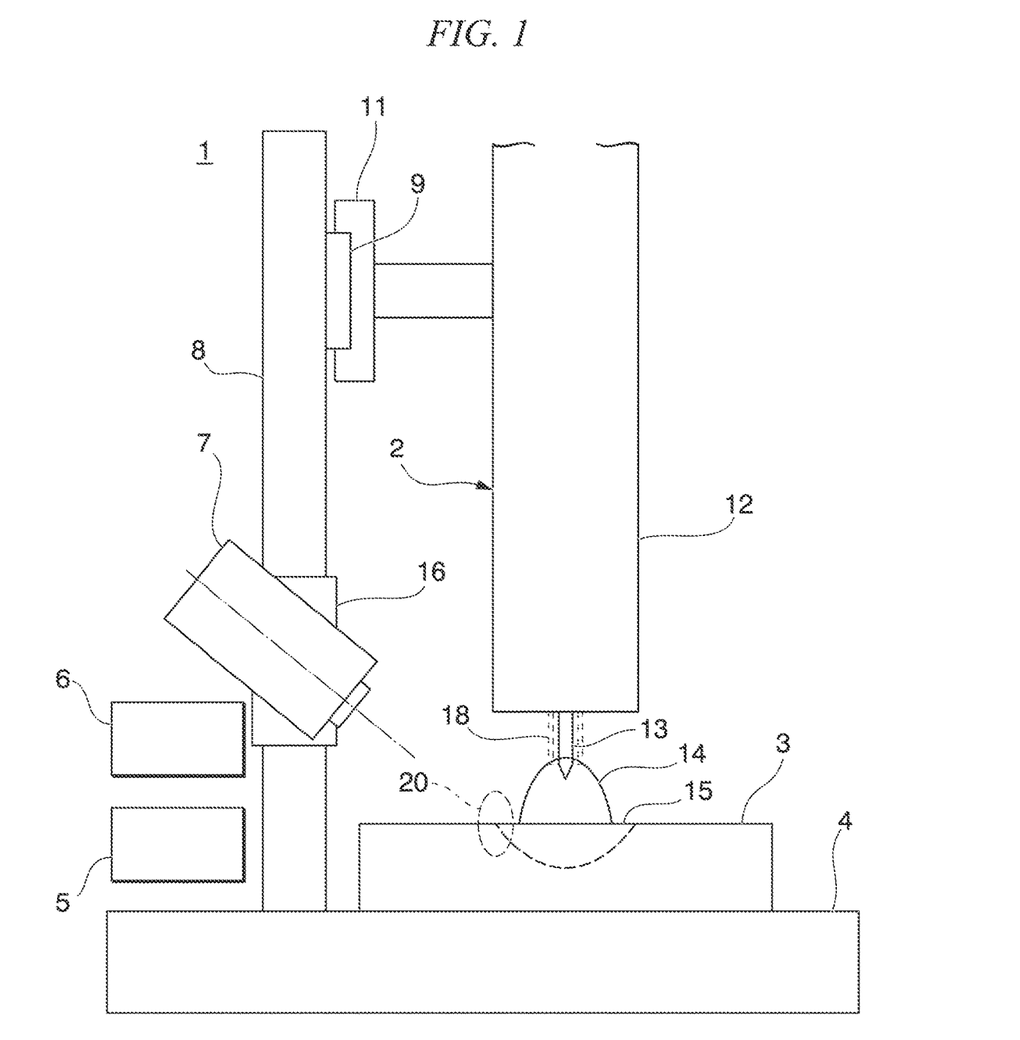
FIG. 1 is a schematic configuration diagram of a high-temperature object observation device according to an embodiment of the present disclosure.
Figure 3:
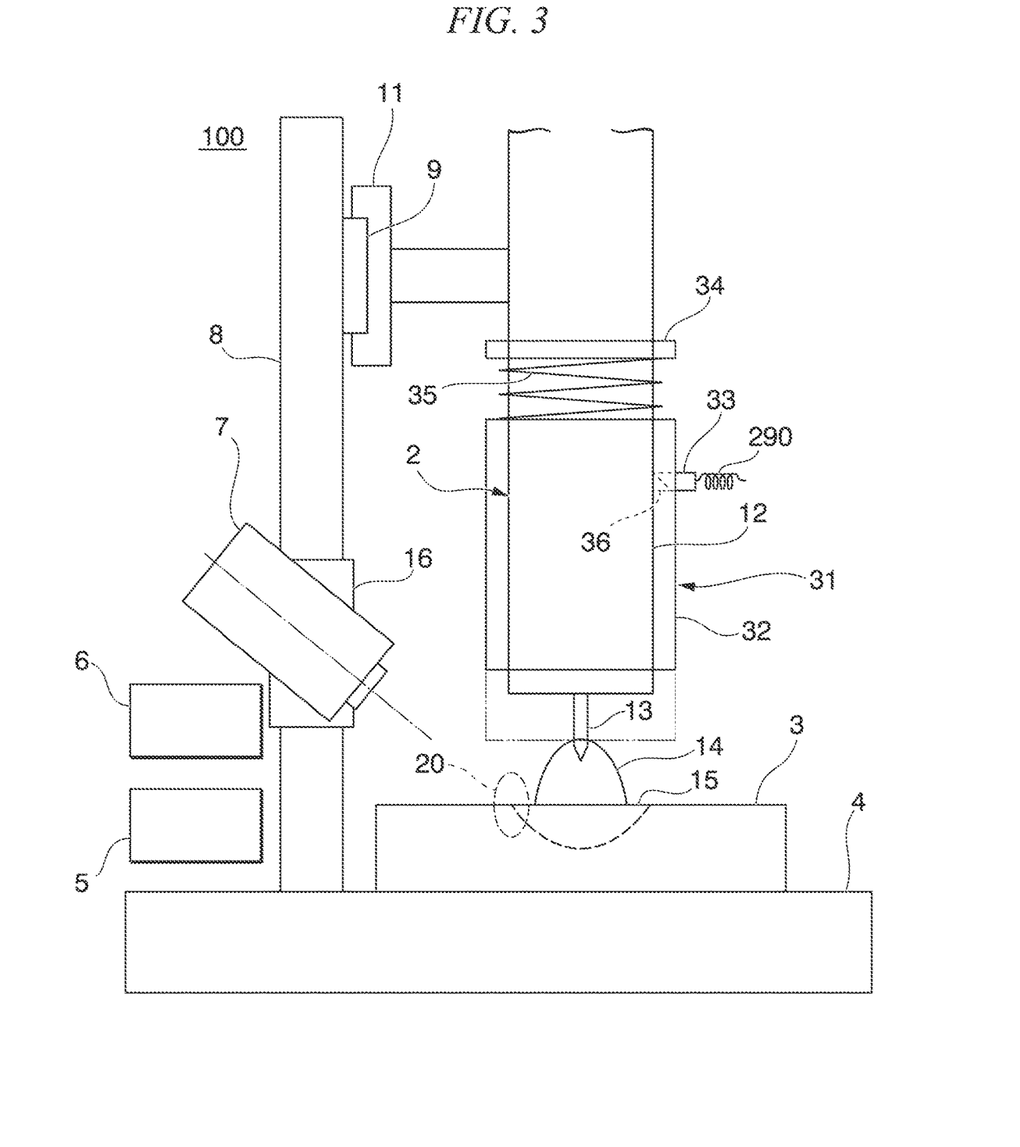
FIG. 3 is a schematic configuration diagram of a high-temperature object observation device according to an embodiment of the present disclosure.
Figure 4:
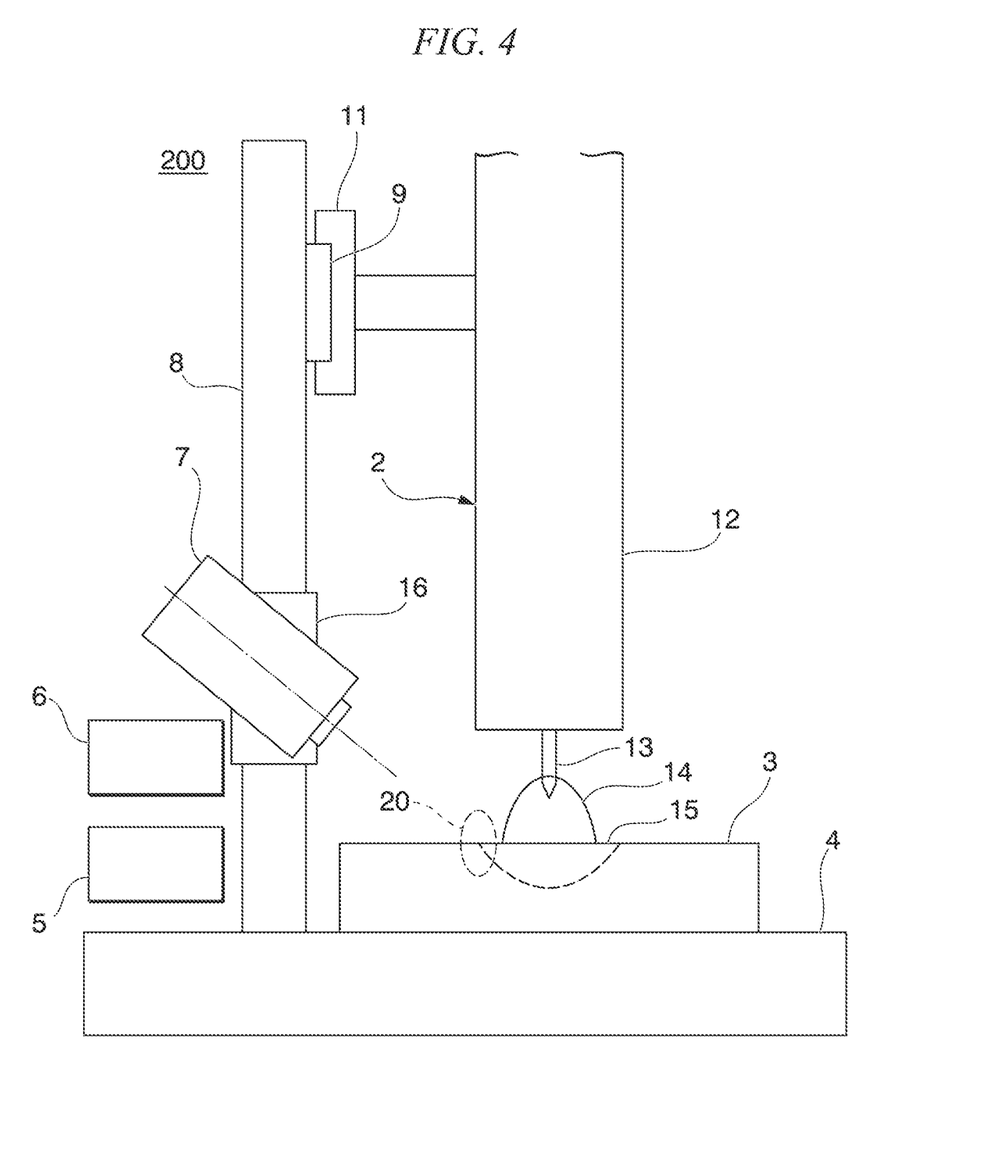
FIG. 4 is a schematic configuration diagram of a high-temperature object observation device according to an embodiment of the present disclosure.

As shown in FIGS. 1, 3, and 4, the observation region 20 may include at least part of the molten pool 15. Furthermore, either of the molten pool 15 or the peripheral part of the molten pool 15 may be included in the observation region 20.

The TIG torch 2 can move vertically with respect to the strut 8 and can be fixed to an arbitrary position. In addition, a light shielding device 17 is provided inside the TIG torch 2.

Figure 2A:
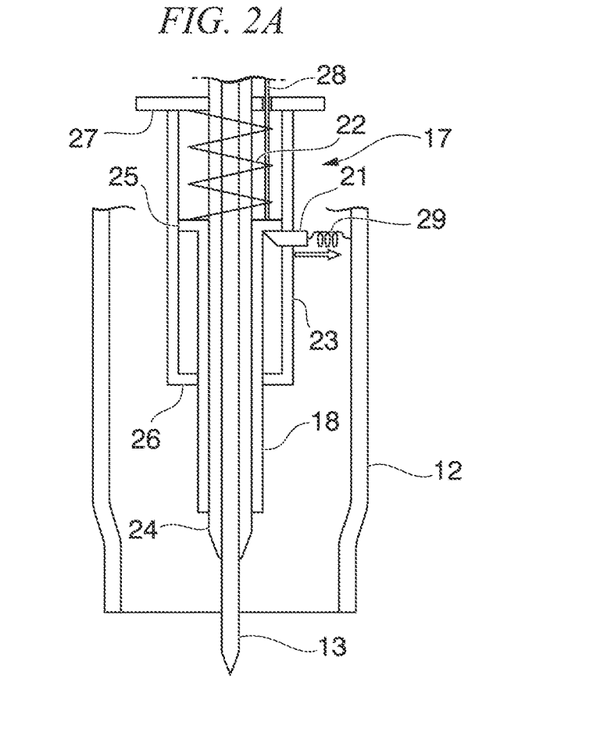
FIG. 2A is a cross-sectional elevation view of the tip part of a welding torch before a light shielding device operates.
Figure 2B:
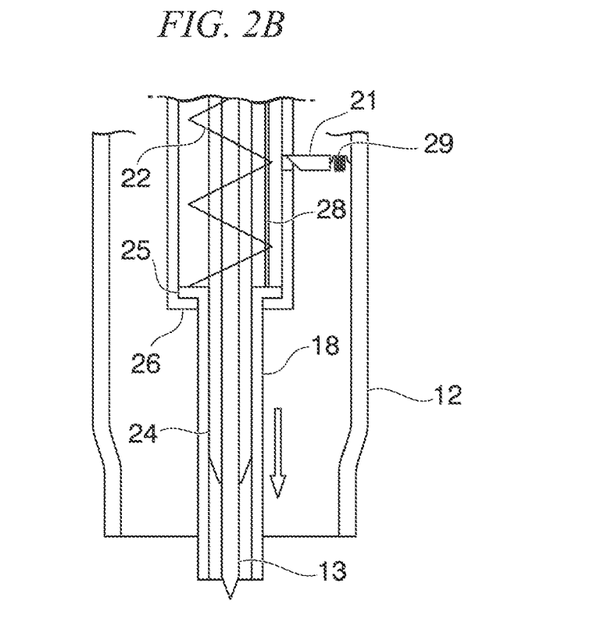
FIG. 2B is a cross-sectional elevation view of the tip part of the welding torch after the light shielding device operates.

The light shielding device 17 shown in FIGS. 2A and 2B includes a light shielding member 18 which is a light shielding part, a hook piece 21 which is a holding part, a compression spring 22 which is a biasing part that biases the light shielding member 18 downward, a protecting tube 23 that houses the light shielding member 18 and the compression spring 22, and an actuator 29 (solenoid) for releasing the holding.

As shown in FIGS. 2A and 2B, the light shielding member 18 is a cylindrical member formed of a heat-resistant member such as, for example, a ceramic. The light shielding member 18 is fitted to the outer circumferential surface of a collet 24 which is a holding member that holds the TIG electrode 13. The collet 24 functions as a guide of the light shielding member 18, and the light shielding member 18 is slidable vertically along the collet 24.

The protecting tube 23 is fitted to the outer circumferential surface of the light shielding member 18. The collet 24, the light shielding member 18, and the protecting tube 23 are formed concentrically with each other, and the light shielding member 18 moves up and down using the collet 24 as a guide, and ascends and descends inside the protecting tube 23.

A flange 25 is formed at the upper end of the light shielding member 18. In addition, an internal flange 26, engaged with the flange 25, which functions as a stopper is formed at the lower end of the protecting tube 23, and an upper-end flange 27, attached to the collet 24, which blocks the upper end of the protecting tube 23 is further formed at the upper end of the protecting tube 23. Here, the collet 24 is connected to an external power supply (not shown) by an electric wire (not shown). The collet 24 is formed of, for example, copper, and thus is supplied with power from the external power supply through the collet 24 to the TIG electrode 13.

The compression spring 22 as a biasing part is provided between the flange 25 and the upper-end flange 27 in a compressed state, and biases the light shielding member 18 downward, that is, in the direction of covering the TIG electrode 13. In addition, in a state where the light shielding member 18 ascends by a predetermined amount, the hook piece 21 and the flange 25 are engaged with each other, and light shielding member 18 is held at an ascending position.

The actuator 29 is formed by, for example, a solenoid, releases the engagement of the hook piece 21 with the flange 25, and releases the holding of the light shielding member 18 by the hook piece 21.

A wire 28 having passed through the upper-end flange 27 is fitted into the flange 25, and the light shielding member 18 ascends by lifting the wire 28. The wire 28 is connected to a lifting device (not shown) or the like, and a lifting force is transmitted to the light shielding member 18 through the wire 28 by driving of the lifting device.

In a state where the flange 25 is engaged with the hook piece 21, the wire 28 is set to be in a movable free state. Therefore, in a case where the engagement of the flange 25 with the hook piece 21 is released, the light shielding member 18 can move without being constrained by the wire 28.

The control unit 5 synchronously controls image capture by the camera 7 and actuator driving of the hook piece 21, captures an image of the observation region 20, measures a temperature, a distribution of temperature, and a change in temperature on the basis of the acquired image, and displays the captured image and the measurement results on the display part 6.

In a state where the light shielding member 18 is located on the upper side, that is, a state where the TIG electrode 13 is located at an exposure position (see FIG. 2A), the hook piece 21 is engaged with the flange 25, and thus the compression spring 22 is constrained in a compressed state.

A current is applied to the actuator 29 by the control unit 5, and the actuator is brought into operation, whereby the engagement of the hook piece 21 with the flange 25 is released. In a case where the engagement of the hook piece 21 with the flange 25 is released, the light shielding member 18 moves instantaneously downward due to the biasing force of the compression spring 22, that is, in the direction of covering the TIG electrode 13.

The downward position of the light shielding member 18 is determined by the flange 25 being engaged with the internal flange 26. In a state where the light shielding member 18 moves downward (see FIG. 2B), the light shielding member 18 covers the vicinity of the TIG electrode 13 over the whole circumference, and radiated light from the TIG electrode 13 is shielded by the light shielding member 18. Thereby, the radiated light is prevented from being reflected from the observation region 20, and the radiated light is prevented from being incident on the camera 7.

Next, the operation of the high-temperature object observation device 1 according to the first embodiment of the present disclosure will be described.

First, the weld object 3 is welded by the TIG torch 2. A current is applied to the TIG electrode 13 protruding from the tip of the shielding gas nozzle 12, and thus the arc 14 is generated between the TIG electrode 13 and the weld object 3. The weld object 3 is melted by the arc 14, and the molten pool 15 is formed. In this case, the TIG electrode 13 performs self-light emission at high temperature, and the observation region 20 is adjacent to the TIG electrode 13 which is a heat source.

When an image of the observation region 20 is acquired, the control unit 5 brings the actuator 29 into operation simultaneously with or immediately before the extinction of the arc 14, for example, before 0 seconds to 0.1 seconds, and releases the engagement of the hook piece 21 with the flange 25.

In a case where the engagement of the hook piece 21 with the flange 25 is released, the light shielding member 18 slides along the collet 24 at a predetermined speed due to the biasing force of the compression spring 22, for example, a speed finally set to be equal to or greater than 200 mm/sec, and the light shielding member 18 covers the vicinity of the TIG electrode 13 over the whole circumference.

The control unit 5 brings the shutter of the camera 7 into operation at a predetermined shutter speed, for example, 0.01 seconds immediately after the arc 14 is extinguished, for example, after 0.03 seconds to 0.06 seconds, and the image of the observation region 20 is acquired by the camera 7.

In this case, the TIG electrode 13 is instantaneously covered with the light shielding member 18, and thus it is possible to remove the influence of the radiated light from the TIG electrode 13 within 0.1 seconds after the extinction of the arc 14. In addition, the camera 7 is brought into operation at the above timing, and thus it is possible to acquire an image obtained by removing the influence of the radiated light from the TIG electrode 13 and keeping an influence due to covering the vicinity of the TIG electrode 13 to a minimum.

After an image is acquired by the camera 7, the control unit 5 performs predetermined processes such as the measurements of the temperature, distribution of temperature, and change in temperature of the observation region 20 and so on, on the basis of the acquired image.

When the predetermined processes such as the measurements of the temperature, distribution of temperature, and change in temperature of the observation region 20 and so on are performed, the control unit 5 can measure temperature by calculating temperature using the Planck's equation for determining a relationship between luminance and temperature, from the luminance of the acquired image. The distribution of temperature can be obtained by measuring temperature over a predetermined spatial range. Regarding the change in temperature, using measured temperature T1 of a certain point s at a certain time t and measured temperature T2 of a certain point s at time t+Δt, a change in temperature ΔT=(T2−T1) of a certain point s can be measured.

The control unit 5 of the present embodiment calculates temperature using the Planck's equation, as described above, from the luminance of the acquired image, and further calculates a distribution of temperature or a change in temperature as described above. Thereby, it is possible to perform processes such as the measurements of the temperature, distribution of temperature, and change in temperature of the observation region 20.

An image acquired by the camera 7 may be not only a still image, but also a moving image. The control unit 5 can also measure the temperature, distribution of temperature, and change in temperature of the observation region 20, in the above principle, from an acquired moving image.

A timing at which the arc 14 is extinguished, a timing at which the actuator 29 is brought into operation, a timing at which the shutter of the camera 7 is brought into operation, and the like are appropriately set so that the image of the observation region 20 immediately after the TIG electrode 13 is covered with the light shielding member 18 can be acquired, on the basis of various conditions of the biasing force of the compression spring 22, and the like.

After an image is acquired by the camera 7, the wire 28 is lifted upward, the flange 25 and the light shielding member 18 are lifted upward in association therewith, and the flange 25 and the hook piece 21 are engaged with each other, which leads to a return to a state shown in FIG. 2A where the flange 25 is held at an ascending position. In a case of a return to the state of FIG. 2A, TIG welding can be restarted.

As described above, in the first embodiment of the disclosure, the light shielding device 17 is brought into operation simultaneously with or immediately before the extinction of the arc 14. Thereby, the TIG electrode 13 that emits light at high temperature immediately after welding is instantaneously covered with the light shielding member 18, and the image of the observation region 20 including the molten pool 15 and its peripheral is acquired by the camera 7 immediately after the light shielding member 18 covers the TIG electrode 13.

Therefore, since the influence of the radiated light from the TIG electrode 13 is removed by the light shielding member 18, and a time for which the TIG electrode 13 is covered is extremely shortened, the light shielding member 18 having covered the TIG electrode 13 is heated, and thus it is possible to acquire an image in which diffused reflection of collateral radiated light from the light shielding member 18 or a change in temperature conditions is kept to a minimum and to accurately measure the distribution of temperature of the observation region 20 immediately after welding.

In addition, since the light shielding member 18 is configured to be formed in a cylindrical shape, slide along the collet 24, and cover the vicinity of the TIG electrode 13 over the whole circumference in close proximity of the TIG electrode 13, the radiated light from the TIG electrode 13 does not leak from the light shielding member 18, and thus it is possible to remove the influence of the radiated light from the TIG electrode 13 with a high degree of accuracy.

In addition, the light shielding member 18 covers the TIG electrode 13 over the whole circumference. Therefore, when the light shielding device 17 is installed, it is possible to easily perform its installation without excessively requiring the dimensional accuracy of the light shielding member 18 for preventing the radiated light from the TIG electrode 13 from leaking.

In addition, since the light shielding device 17 is provided inside the TIG torch 2, and the light shielding member 18 is configured to cover the vicinity of the TIG electrode 13, that is, the light shielding member 18 is provided between the shielding gas nozzle 12 and the TIG electrode 13, it is possible to achieve space saving without requiring a space for providing the light shielding device 17 in the vicinity of the TIG torch 2.

In addition, the image of the observation region 20 is continuously acquired using a high-speed camera as the camera 7, and the measurement of a distribution of temperature is performed. Therefore, it is possible to measure the state of a change in temperature of the observation region 20. The state of a change in temperature of the observation region 20 is measured, and thus it is possible to obtain, for example, a correlation between the state of occurrence of hot cracking after welding and a distribution of temperature.

Next, in FIG. 3, a high-temperature object observation device 100 according to a second embodiment of the present disclosure will be described. In FIG. 3, the same components as those in FIG. 1 are denoted by the same reference signs, and thus the description thereof will not be given.

A light shielding device 31 in the high-temperature object observation device 100 according to the second embodiment includes a light shielding member 32, a hook piece 33 which is a holding part, a flange 34, a compression spring 35 which is a biasing part, and an actuator 290 for releasing the holding.

The light shielding member 32 which is a light shielding part in the second embodiment is a cylindrical member formed of a heat-resistant member such as, for example, a ceramic, is fitted to the outer circumferential surface of the shielding gas nozzle 12, and is slidable vertically along the outer circumferential surface of the shielding gas nozzle 12. In addition, the flange 34 is formed above the light shielding member 32 of the shielding gas nozzle 12, and the compression spring 35 is provided between the flange 34 and the light shielding member 32.

A hole 36 is drilled in a midway part of the light shielding member 32, and the hook piece 33 is engaged with the hole 36. In a state where the hook piece 33 is engaged with the hole 36, the light shielding member 32 is held at an ascending position, that is, in a state where the TIG electrode 13 is exposed. In a case where the engagement of the hook piece 33 with the hole 36, that is, the holding of the light shielding member 32 by the hook piece 33 is released, the light shielding member 32 held at an ascending position moves instantaneously downward due to the biasing force of the compression spring 35, that is, in the direction of covering the TIG electrode 13, and covers the vicinity of the TIG electrode 13 over the whole circumference.

When the arc 14 is extinguished, and welding is terminated, the TIG electrode 13 emits light at high temperature, and the observation region 20 is adjacent to the TIG electrode 13 which is a heat source. In this state, the control unit 5 brings the actuator 29 into operation, and releases the engagement of the hook piece 33 with the hole 36 to thereby move the light shielding member 32 instantaneously downward. Thereby, the TIG electrode 13 is covered with the light shielding member 32 over the whole circumference, and thus it is possible to instantaneously shield radiated light which is radiated from the TIG electrode 13 toward the observation region 20.

Immediately after the TIG electrode 13 is shielded by the light shielding member 32, the camera 7 acquires the image of the observation region 20 through the control unit 5, and thus it is possible to acquire the image of the observation region 20 in which the influence of the radiated light from the TIG electrode 13 is removed and to perform various measurements on the basis of this image.

In the second embodiment, similarly, since the light shielding member 32 is configured to be formed in a cylindrical shape, and cover the vicinity of the TIG electrode 13 over the whole circumference, the radiated light from the TIG electrode 13 does not leak from the vicinity of the light shielding member 32, and thus it is possible to remove the influence of the radiated light with a high degree of accuracy. In addition, when the light shielding device 31 is installed, it is possible to easily install the light shielding device 31 without excessively requiring the dimensional accuracy of the light shielding member 32 for preventing the radiated light from the TIG electrode 13 from leaking.

In addition, the light shielding member 32 covers the vicinity of the shielding gas nozzle 12. Therefore, in a state where the light shielding member 32 moves downward, and the TIG electrode 13 is shielded by the light shielding member 32, the light shielding member 32 serves as a guide of a shielding gas ejected from the shielding gas nozzle 12, and thus it is possible to make the shielding gas reliably reach the molten pool 15.

In the second embodiment, the light shielding member 32 is located outside of the shielding gas nozzle 12, and the shielding gas flowing through the shielding gas nozzle 12 serves as a coolant. Therefore, since the light shielding member 32 is not likely to be thermally influenced by the TIG electrode 13, the light shielding member 32 may be formed of a metallic material such as an aluminum material or an iron material and the like.

In a case where the light shielding member 32 is formed of a metallic material, radiated light has the possibility of being diffusely reflected between the light shielding member 32 and the molten pool 15. Therefore, blackening treatment such as black alumite treatment in a case where the light shielding member 32 is formed of an aluminum material and Tufftride (Registered Trademark) treatment in a case where the light shielding member 32 is formed of an iron material and the like may be performed on the light shielding member 32. Blackening treatment is performed on the light shielding member 32, and thus it is possible to suppress the diffused reflection of radiated light occurring between the TIG electrode 13 and the light shielding member 32 or between the molten pool 15 and the light shielding member 32.

In a case of a return to state where the light shielding member 32 having descended shown by a dotted line in FIG. 3 is lifted upward, and the light shielding member 32 is held at an ascending position with the hook piece 33 engaged with the hole 36, that is, a state where the TIG electrode 13 is exposed, it is possible to restart welding. Since the light shielding member 32 is exposed to the outside, a worker may manually lift the light shielding member 32 upward, and may lift the light shielding member 32 upward using a member such as the wire 28 of the first embodiment.

Next, in FIGS. 4, 5A, 5B, 5C, and 5D, a third embodiment of the present disclosure will be described. In FIGS. 4, 5A, 5B, 5C, and 5D, the same components as those in FIGS. 1, 2A, 2B, or 3 are denoted by the same reference signs, and thus the description thereof will not be given.

FIG. 4 is a schematic configuration diagram of a high-temperature object observation device 200 according to the third embodiment of the present disclosure. The difference between the configuration of the high-temperature object observation device 200 shown in FIG. 4 and the configuration of the high-temperature object observation device 1 shown in FIG. 1 lies in that, in FIG. 4, the light shielding member 18 shown in FIG. 1 is not provided.

In the light shielding device 17 in the high-temperature object observation device 1 according to the first embodiment of the present disclosure, the light shielding member 18 which is a light shielding part moves downward, and thus the light shielding member 18 covers the vicinity of the TIG electrode 13 over the whole circumference. Thereby, the radiated light from the TIG electrode 13 is shielded by the light shielding member 18, the radiated light is prevented from being reflected from the observation region 20, and the radiated light is prevented from being incident on the camera 7.

On the other hand, in a light shielding device 201 in the high-temperature object observation device 200 according to the third embodiment of the present disclosure, a TIG electrode 130 moves upward, and thus the TIG electrode 130 is covered with the shielding gas nozzle 12 which is a light shielding part over the whole circumference. Therefore, radiated light from the TIG electrode 130 is shielded by the shielding gas nozzle 12, the radiated light is prevented from being reflected from the observation region 20, and the radiated light is prevented from being incident on the camera 7.

Figure 5A:
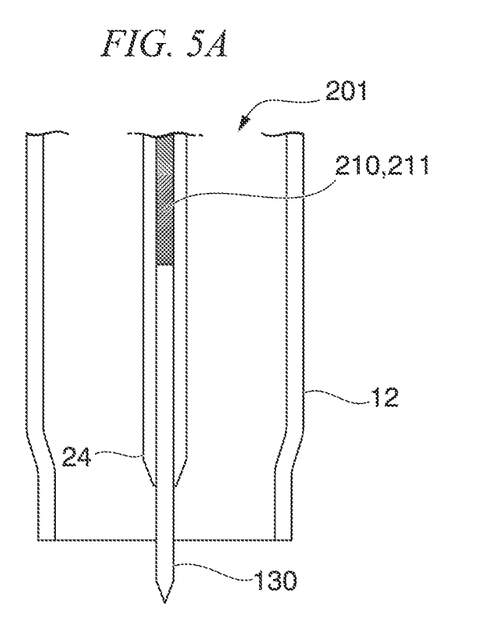
FIG. 5A is a cross-sectional elevation view of the tip part of the welding torch before the light shielding device operates.
Figure 5B:
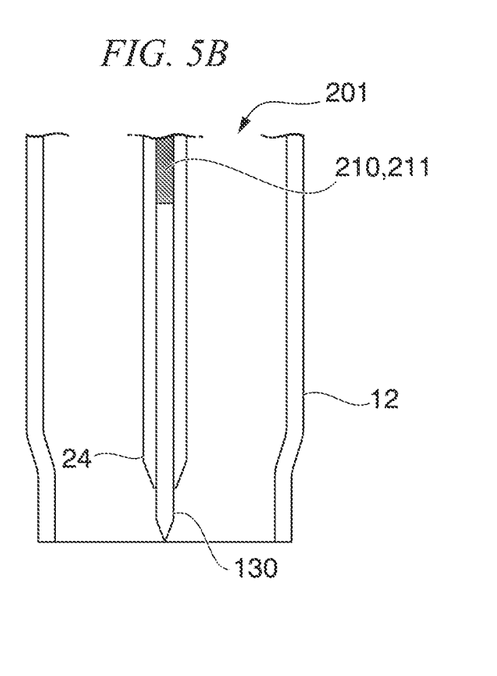
FIG. 5B is a cross-sectional elevation view of the tip part of the welding torch after the light shielding device operates.

The light shielding device 201 shown in FIG. 5A includes an electromotive linear actuator 210 which is a biasing part bonded to the base end of the TIG electrode 130. The electromotive linear actuator 210 is, for example, the electromotive linear actuator 210 that makes itself slide instantaneously upward from a state shown in FIG. 5A. With such movement of the electromotive linear actuator 210, the TIG electrode 130 bonded to the tip of the electromotive linear actuator 210 is also lifted instantaneously upward. Next, as shown in FIG. 5B, the electromotive linear actuator 210 holds the TIG electrode 130 in a state where the TIG electrode 130 is covered with the shielding gas nozzle 12 over the whole circumference.

Here, the TIG electrode 130 is held by the collet 24 and is supplied with power from an external power supply through the collet 24 to the TIG electrode 130. However, in a case of the present embodiment, the TIG electrode 130 biased by the electromotive linear actuator 210 which is a biasing part can slide up and down in the inside of the collet 24. Therefore, the collet 24 holds the TIG electrode to such an extent that the TIG electrode can slide with respect to the inner circumferential surface of the collet 24, and that power can be supplied to the TIG electrode 130 through the collet 24.

Here, the electromotive linear actuator 210 which is a biasing part can hold the TIG electrode 130 in a state where the TIG electrode 130 shown in FIG. 5A is exposed, and thus also serves as a holding part.

When the arc 14 is extinguished, and welding is terminated, the TIG electrode 130 emits light at high temperature, and the observation region 20 is adjacent to the TIG electrode 130 which is a heat source. In this state, the control unit 5 brings the electromotive linear actuator 210 into operation, and lifts the TIG electrode 130 upward. Thereby, the TIG electrode 130 is covered with the shielding gas nozzle 12 over the whole circumference, and thus it is possible to instantaneously shield radiated light which is radiated from the TIG electrode 130 toward the observation region 20.

Immediately after the TIG electrode 130 is shielded by the shielding gas nozzle 12, the camera 7 acquires the image of the observation region 20 through the control unit 5, and thus it is possible to acquire the image of the observation region 20 in which the influence of the radiated light from the TIG electrode 130 is removed and to perform various measurements on the basis of this image.

In addition, from a state shown in FIG. 5B where the TIG electrode 130 is covered with the shielding gas nozzle 12 over the whole circumference, the electromotive linear actuator 210 which is a biasing part is brought into operation to thereby cause the TIG electrode 130 to descend and move to a position shown in FIG. 5A, and thus it is possible to restart welding.

In the third embodiment, since the shielding gas nozzle 12 is configured to cover the vicinity of the TIG electrode 130 over the whole circumference, the radiated light from the TIG electrode 130 does not leak from the vicinity of the shielding gas nozzle 12 while a simple configuration is used in which the light shielding members 18 and 32 used in the first embodiment or the second embodiment are not required, and thus it is possible to remove the influence of the radiated light with a high degree of accuracy. In addition, when the light shielding device 201 is installed, it is possible to easily install the light shielding device 201 without excessively requiring the dimensional accuracy of the shielding gas nozzle 12 for preventing the radiated light from the TIG electrode 130 from leaking.

In a case where the shielding gas nozzle 12 is formed of a metallic material, there is a possibility of radiated light being diffusely reflected between the shielding gas nozzle 12 and the molten pool 15. Therefore, blackening treatment such as black alumite treatment in a case where the shielding gas nozzle 12 is formed of an aluminum material and Tufftride (Registered Trademark) treatment in a case where the shielding gas nozzle 12 is formed of an iron material and the like may be performed on the shielding gas nozzle 12. Blackening treatment is performed on the shielding gas nozzle 12, and thus it is possible to suppress the diffused reflection of radiated light occurring between the TIG electrode 130 and the shielding gas nozzle 12 or between the molten pool 15 and the shielding gas nozzle 12.

In the third embodiment, a case where the electromotive linear actuator 210 is used as a biasing part is mentioned as an example, but a vacuum linear actuator 211 or a tension spring 212 may be used as a biasing part, instead of the electromotive linear actuator 210. In a case where the vacuum linear actuator 211 is used as a biasing part, the vacuum linear actuator can be used similarly to a case where the electromotive linear actuator 210 is used as a biasing part, and thus the same description as that in the above case made with reference to FIGS. 5A and 5B can be applied.

On the other hand, an example of a light shielding device 202 in a case where the tension spring 212 is used as a biasing part will be described with reference to FIGS. 5C and 5D.

Figure 5C:
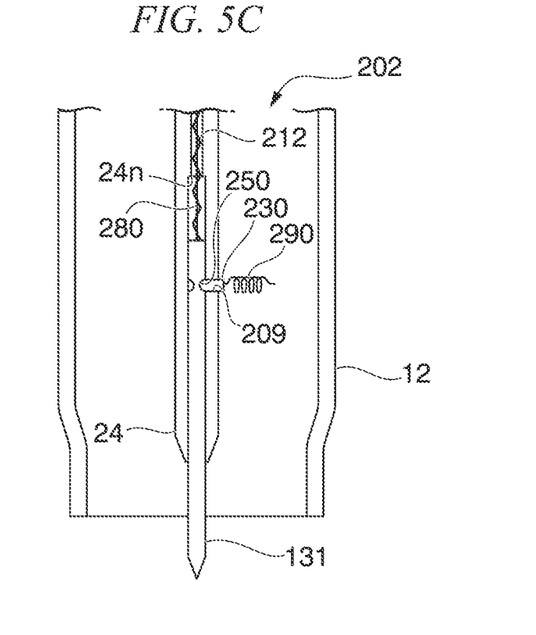
FIG. 5C is a cross-sectional elevation view of the tip part of the welding torch before the light shielding device operates.
Figure 5D:
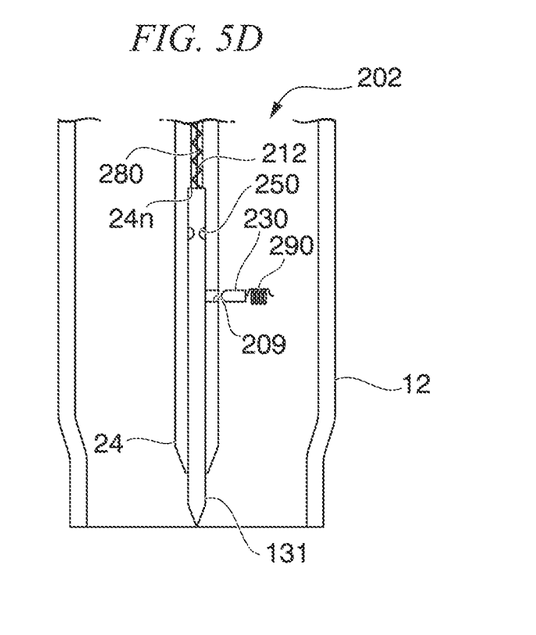
FIG. 5D is a cross-sectional elevation view of the tip part of the welding torch after the light shielding device operates.

The light shielding device 202 shown in FIG. 5C includes a TIG electrode 131 and the tension spring 212 which is a biasing part bonded to the base end of the TIG electrode 131. The function of the tension spring 212 is to lift the TIG electrode 131 upward, similarly to that of the electromotive linear actuator 210 or the vacuum linear actuator 211.

Here, in a case where the biasing part is the tension spring 212, the following configuration is formed in which the positioning of the TIG electrode 131 is performed by restricting the up-and-down motion of the biasing part.

That is, a reduced-diameter concave portion 250 in which the outside diameter of the TIG electrode 131 is reduced so as to be concave over the whole circumference of the TIG electrode 131 is provided in the vicinity of the upper end of the TIG electrode 131. In addition, in a case where the TIG electrode 131 shown in FIG. 5C descends and is held at a weldable position, a hook piece 230 which is a holding part engaged with the reduced-diameter concave portion 250 to hold the TIG electrode 131 passes through a hole 209 passing through the collet 24, and is engaged with the reduced-diameter concave portion 250 of the TIG electrode 131. Therefore, in a state shown in FIG. 5C, the hook piece 230 holds the tension spring 212 in a tensed state against a force by which the tension spring 212 lifts the TIG electrode 131, and thus it is possible to hold the TIG electrode 131 at a weldable position where the TIG electrode 131 has descended.

A current is applied to the actuator 290 by the control unit 5, and the actuator is brought into operation, whereby the engagement of the hook piece 230 with the reduced-diameter concave portion 250 is released. In a case where the engagement of the hook piece 230 with the reduced-diameter concave portion 250 is released, the TIG electrode 131 is lifted instantaneously upward, and as shown in FIG. 5D, the vicinity of the TIG electrode 131 is covered with the shielding gas nozzle 12 which is a light shielding part over the whole circumference light.

In this case, in the state shown in FIG. 5C, the inside diameter of the collet 24 is reduced so that the TIG electrode 131 is not able to penetrate upward of a reduced-diameter part 24n of the collet 24 which is located a predetermined distance upward of the upper end of the TIG electrode 131. Therefore, even in a case where the TIG electrode 131 is lifted upward by the tension spring 212, the TIG electrode 131 has its ascending position determined by the the reduced-diameter part 24n. Even in a case where the TIG electrode 131 is located at an ascending position, an upward lifting force acts on the TIG electrode 131 through the tension spring 212, and thus the TIG electrode 131 is held at an ascending position.

When the arc 14 is extinguished, and welding is terminate, the TIG electrode 131 emits light at high temperature, and the observation region 20 is adjacent to the TIG electrode 131 which is a heat source. In this state, the control unit 5 brings the actuator 290 into operation to release the engagement of the hook piece 230 with the reduced-diameter concave portion 250, and thus the tension spring 212 is brought into operation to lift the TIG electrode 131 upward. Then, the TIG electrode 131 is covered with the shielding gas nozzle 12 over the whole circumference, and thus it is possible to instantaneously shield radiated light which is radiated from the TIG electrode 131 toward the observation region 20.

Immediately after the TIG electrode 131 is shielded by the shielding gas nozzle 12, the camera 7 acquires the image of the observation region 20 through the control unit 5, and thus it is possible to acquire the image of the observation region 20 in which the influence of the radiated light from the TIG electrode 131 is removed and to perform various measurements on the basis of this image.

A wire 280 capable of moving the TIG electrode 131 up and down is bonded to the upper end of the TIG electrode 131. When image capture by the camera 7 is terminated, the wire 280 is pushed downward from a state shown in FIG. 5D where the TIG electrode 131 is covered with the shielding gas nozzle 12, and thus the TIG electrode 131 is pushed downward until the hook piece 230 is engaged with the reduced-diameter concave portion 250. The hook piece 230 holds the TIG electrode 131 at a position shown in FIG. 5C where the TIG electrode 131 is exposed, and thus it is possible to restart welding.

In a state where the hook piece 230 is engaged with the reduced-diameter concave portion 250, the wire 280 is set to be in a movable free state. Therefore, in a case where the engagement of the hook piece 230 with the reduced-diameter concave portion 250 is released, the TIG electrode 131 can move without being constrained by the wire 280.

In addition, in the first embodiment, the second embodiment, and the third embodiment, temperature distribution measurement in a case where downward TIG welding is performed is described as an example, but high-temperature object observation devices 1, 100, and 200 can be applied even in a case where overhead welding and lateral welding are performed.

In the present disclosure, a case is mentioned in which the light shielding part is the cylindrical light shielding members 18 and 32 or the cylindrical shielding gas nozzle 12, but the light shielding members 18 and 32 or the shielding gas nozzle 12 is not always required to be a cylinder, and may be an ellipse cylinder, a truncated cone, an elliptical frustum, or the like, insofar as a heat source can be covered.

In addition, a case is mentioned, as an example, in which the biasing part is the compression springs 22 and 35, the tension spring 212, the electromotive linear actuator 210, and the vacuum linear actuator 211; however, the biasing part is not particularly limited insofar as the biasing part is a member having a function of linearly biasing the light shielding members 18 and 32 or the TIG electrodes (heat sources) 13, 130, and 131. For example, a biasing member that performs biasing using an air pressure, a hydraulic pressure or the like of fluid, and a biasing member that performs biasing using a magnetic force may be used in addition to the above-described members.

Hereinbefore, the embodiments of the present disclosure have been described with reference the accompanying drawings, but the present disclosure is not limited to the above embodiments. The shapes, combination or the like of the respective configuration members shown in the above-described embodiments is an example, and various changes and modifications can be made on the basis of the requirements of design or the like in the scope of the present disclosure determined by claims.

INDUSTRIAL APPLICABILITY

According to the present disclosure, it is possible to provide a high-temperature object observation device that exhibits an excellent effect of capable of accurately measuring a distribution of temperature of an observation region with radiated light from a heat source removed with a high degree of accuracy, and capable of easily installing a light shielding device without requiring excessive accuracy in the installation of the light shielding device.

What is claimed is:

1. A high-temperature object observation device comprising:
    a camera capable of acquiring an image of an observation region adjacent to a heat source; and
    a light shielding device,
    wherein the light shielding device includes a light shielding part that covers a vicinity of the heat source, a holding part that holds the heat source at a position exposed from the light shielding part, and an actuator that releases the holding of the holding part, and
    immediately after the light shielding device is brought into operation and the heat source is covered with the light shielding part, the camera acquires an image of the observation region.

2. The high-temperature object observation device according to claim 1, further comprising a biasing part that biases the light shielding part in a direction of covering the heat source.

3. The high-temperature object observation device according to claim 2, wherein the heat source is an electrode of a TIG torch, and the light shielding part is a cylindrical light shielding member capable of accommodating the electrode.

4. The high-temperature object observation device according to claim 3, wherein the biasing part is a compression spring.

5. The high-temperature object observation device according to claim 2, wherein the heat source is an electrode of a TIG torch, and the light shielding part is a cylindrical light shielding member, fitted into an outer circumferential surface of a shielding gas nozzle provided in a vicinity of the electrode, which moves along the shielding gas nozzle.

6. The high-temperature object observation device according to claim 5, wherein the biasing part is a compression spring.

7. The high-temperature object observation device according to claim 1, further comprising a biasing part that biases the heat source in a direction of being covered with the light shielding part.

8. The high-temperature object observation device according to claim 7, wherein the heat source is an electrode of a TIG torch, and the light shielding part is a cylindrical shielding gas nozzle provided in a vicinity of the electrode.

9. The high-temperature object observation device according to claim 8, wherein the biasing part is an electromotive linear actuator.

10. The high-temperature object observation device according to claim 8, wherein the biasing part is a vacuum linear actuator.

11. The high-temperature object observation device according to claim 8, wherein the biasing part is a tension spring.

12. The high-temperature object observation device according to claim 1, wherein the camera is a digital camera capable of high-speed photography, and is capable of continuously acquiring an image of the observation region.

13. The high-temperature object observation device according to claim 2, wherein the camera is a digital camera capable of high-speed photography, and is capable of continuously acquiring an image of the observation region.

14. The high-temperature object observation device according to claim 3, wherein the camera is a digital camera capable of high-speed photography, and is capable of continuously acquiring an image of the observation region.

15. The high-temperature object observation device according to claim 4, wherein the camera is a digital camera capable of high-speed photography, and is capable of continuously acquiring an image of the observation region.

16. The high-temperature object observation device according to claim 5, wherein the camera is a digital camera capable of high-speed photography, and is capable of continuously acquiring an image of the observation region.

17. The high-temperature object observation device according to claim 6, wherein the camera is a digital camera capable of high-speed photography, and is capable of continuously acquiring an image of the observation region.

18. The high-temperature object observation device according to claim 7, wherein the camera is a digital camera capable of high-speed photography, and is capable of continuously acquiring an image of the observation region.

19. The high-temperature object observation device according to claim 8, wherein the camera is a digital camera capable of high-speed photography, and is capable of continuously acquiring an image of the observation region.

20. The high-temperature object observation device according to claim 9, wherein the camera is a digital camera capable of high-speed photography, and is capable of continuously acquiring an image of the observation region.

* * * * *